United States Patent

Oprescu-Surcobe et al.

[11] Patent Number: 5,842,130
[45] Date of Patent: Nov. 24, 1998

[54] METHOD FOR IDENTIFYING A MOBILE UNIT IN A WIRELESS COMMUNICATION SYSTEM

[75] Inventors: Valentin Oprescu-Surcobe, Northbrook; Scott Thomas Droste, Crystal Lake, both of Ill.; Brian Chen, Singapore, Singapore

[73] Assignee: Motorola, Inc., Schaumburg, Ill.

[21] Appl. No.: 865,319

[22] Filed: May 29, 1997

[51] Int. Cl.$^6$ ............................... H04Q 7/20
[52] U.S. Cl. .................. 455/456; 455/562; 342/457
[58] Field of Search ..................... 455/456, 561, 455/562, 453; 342/457; 370/334, 335, 252, 328

[56] References Cited

U.S. PATENT DOCUMENTS

| | | | |
|---|---|---|---|
| 5,512,908 | 4/1996 | Herrick | 455/456 |
| 5,552,795 | 9/1996 | Tayloe et al. | 455/456 |
| 5,579,535 | 11/1996 | Orlen et al. | 455/456 |
| 5,732,354 | 6/1995 | MacDonald | 455/456 |
| 5,736,964 | 2/1996 | Ghosh et al. | 455/456 |

*Primary Examiner*—Edward F. Urban
*Assistant Examiner*—Tilahun Gesesse
*Attorney, Agent, or Firm*—Heather L. Creps

[57] ABSTRACT

The method operates in a wireless communication system, and includes receiving at a first base station having a first location, a widebeam signal from a first mobile communication unit having a second location; measuring, by the first base station, a characteristic of the received widebeam signal to form a first widebeam characteristic; receiving the widebeam signal at a second base station having a third location; measuring, by the second base station, the characteristic of the received widebeam signal to form a second widebeam characteristic; receiving, at the first base station, a narrowbeam signal from the first mobile communication unit; measuring, by the first base station, a characteristic of the received narrowbeam signal to form a first narrowbeam characteristic; receiving the narrowbeam signal at the second base station; measuring, by the second base station, the characteristic of the received narrowbeam signal to form a second narrowbeam characteristic; comparing the first widebeam characteristic and the first narrowbeam characteristic to form a first comparison value; comparing the second widebeam characteristic and the second narrowbeam characteristic to form a second comparison value; establishing a reference axis; based on the first comparison value, the second comparison value, the first location, the second location, the third location, and the reference axis, determining a region associated with the narrowbeam signal; identifying a second mobile communication unit within the region; and forwarding an identity of the second mobile communication unit to the first mobile communication unit.

20 Claims, 4 Drawing Sheets

METHOD FOR IDENTIFYING A MOBILE UNIT IN A WIRELESS COMMUNICATION SYSTEM

FIELD OF THE INVENTION

This invention relates generally to wireless communication systems, and, more particularly, to a method for identifying a mobile communication unit in a wireless communication system.

BACKGROUND OF THE INVENTION

In a typical wireless communication system such as a digital radio frequency (RF) radiotelephone system, a base station system, (BSS), having one or more base station transmitters and receivers, commonly referred to as base transceiver stations (BTS), and a base station controller (BSC), communicates via a radio frequency (RF) channel with a mobile communication unit, commonly referred to as a mobile station (MS), operating within an area served by at least one BTS. Such systems may be direct sequence code division multiple access (DS-CDMA) cellular communication systems or CDMA personal communication systems (CDMA PCS), such as set forth in the Telecommunications Industry Association Interim Standard 95A (TIA IS-95A), ANSI J-STD-008 and their subsequent revisions and addenda, or TIA Telecommunications Systems Bulletin, TSB 74: Support for 14.4 kbps Data Rate and PCS Interaction for Wideband Spread Spectrum Cellular Systems", February 1996 [the Bulletin], all incorporated herein by reference. According to these standards, coded communication signals are transmitted in common 1.25 MHz carriers between base stations and mobile stations that are communicating in the service coverage areas of the base stations.

A mobile station antenna, which radiates in an omni-directional pattern, is capable of radiating a widebeam signal. A base station antenna is capable of receiving the widebeam signal on an antenna such as an omni-directional antenna, or a sector antenna, sectorization determined by the wireless communication system configuration.

The service coverage areas of base stations are arranged to partially overlap in such a manner as to provide a substantially continuous coverage area in which a mobile station receiving service from one base station, or source base station, may be in RF contact with adjacent base station. As a result a communication signal associated with the mobile communication unit may be handed off to an adjacent base station with no interruption in service.

The characteristic of a mobile station being in contact with multiple base sites enables the use of location finding services such as those based on trilateration or triangulation. Trilateration is a well known procedure used to compute the position of a mobile communication unit relative to three other reference points, for example three base stations.

In addition to trilateration, other methods of determining the location of a mobile station may be used. For example, one method employs the use of a Global Positioning System (GPS).

In a number of situations in which there is access to a wireless communication network, it may be desirable to identify the mobile station's unique identity. Although the location or position of a mobile station within a cellular network may be determined using aforementioned methods well known in the art, there remains a need for a method to acquire the unique identity of a particular mobile communication unit within a wireless communication system.

SUMMARY OF THE INVENTION

According to an aspect of the present invention, the foregoing needs are addressed by a method for identifying a mobile communication unit operates in a wireless communication system. The method includes receiving at a first base station having a first location, a widebeam signal from a first mobile communication unit having a second location; measuring, by the first base station, a characteristic of the received widebeam signal to form a first widebeam characteristic; receiving the widebeam signal at a second base station having a third location; measuring, by the second base station, the characteristic of the received widebeam signal to form a second widebeam characteristic; receiving, at the first base station, a narrowbeam signal from the first mobile communication unit; measuring, by the first base station, a characteristic of the received narrowbeam signal to form a first narrowbeam characteristic; receiving the narrowbeam signal at the second base station; measuring, by the second base station, the characteristic of the received narrowbeam signal to form a second narrowbeam characteristic; comparing the first widebeam characteristic and the first narrowbeam characteristic to form a first comparison value; comparing the second widebeam characteristic and the second narrowbeam characteristic to form a second comparison value; establishing a reference axis; based on the first comparison value, the second comparison value, the first location, the second location, the third location, and the reference axis, determining a region associated with the narrowbeam signal; identifying a second mobile communication unit within the region; and forwarding an identity of the second mobile communication unit to the first mobile communication unit.

According to another aspect of the present invention, a method for identifying a mobile communication unit operates in a wireless communication system. The method includes establishing a line-of-sight between a first mobile communication unit and a second communication unit; determining a location of the first mobile communication unit; transmitting from the first mobile communication unit to a first base station having a first location, a widebeam signal; transmitting from the first mobile communication unit to a second base station having a second location, the widebeam signal; transmitting from the first mobile communication unit to the first base station, a narrowbeam signal; transmitting from the first mobile communication unit to the second base station, the narrowbeam signal; receiving at the first mobile communication unit from the first base station, a first comparison value; receiving at the first mobile communication unit from the second base station, a second comparison value; based on the first comparison value, and the second comparison value, calculating a region associated with the narrowbeam signal; and receiving at the first mobile communication unit, receiving by the first mobile communication unit, an identity of the second mobile communication unit within the region.

DETAILED DESCRIPTION OF THE PREFERRED EMBODIMENT

Figure 1:
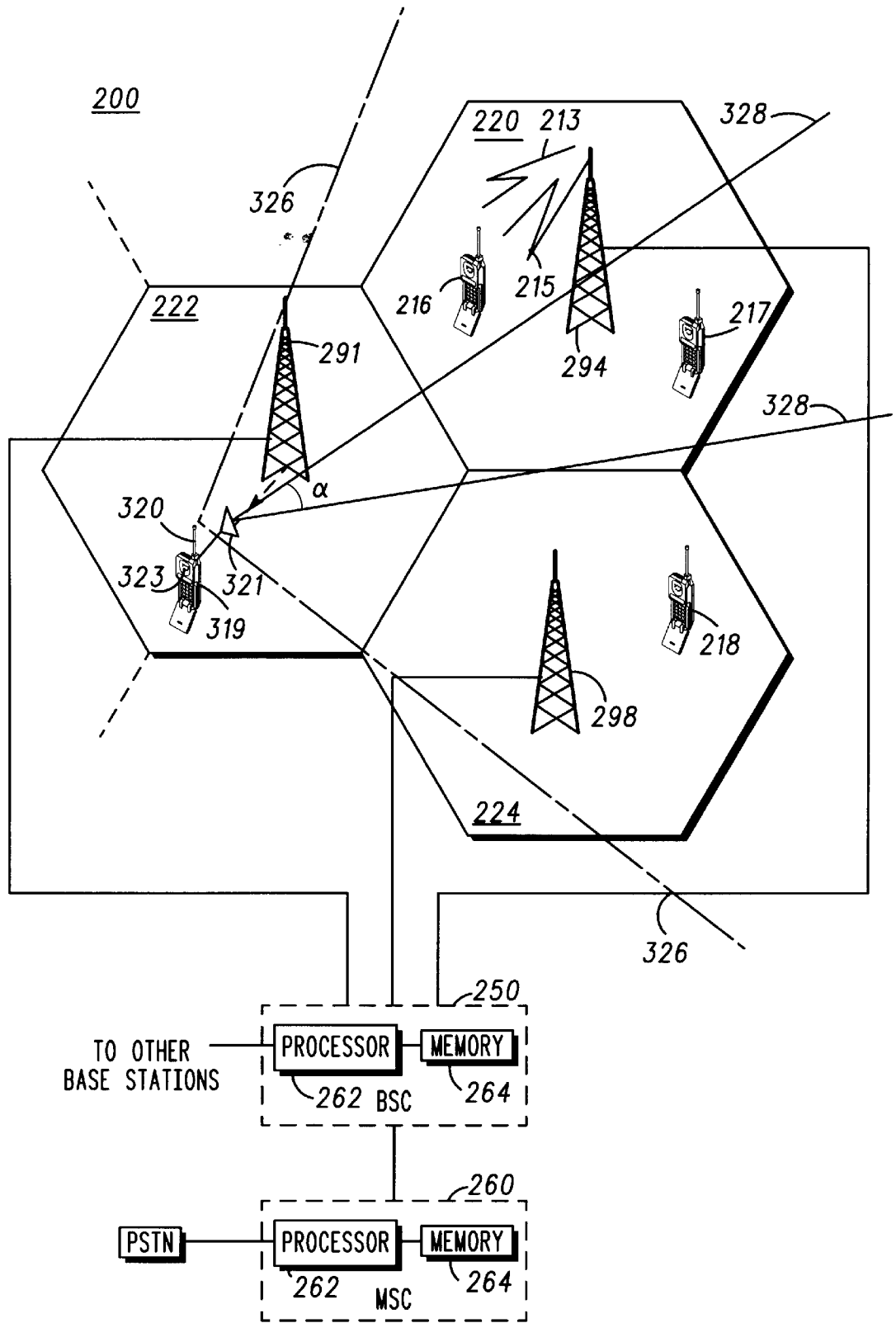
FIG. 1 illustrates a wireless communication system according to a preferred embodiment of the present invention.

Turning now to the drawings, wherein like numerals designate like components, FIG. 1 illustrates a wireless communication system 200, such as a direct sequence code division multiple access (DS-CDMA) digital radiotelephone system. Base stations 298, 294 and 291 may communicate with mobile stations 216 and 217, operating within coverage area 220, served by base station 294. Similarly, base stations 298, 294 and 291 may communicate with a mobile station 218 operating within coverage area 224 served by base station 298. Coverage area 222 is served by base station 291. Base stations have fixed locations, such locations chosen to provide overlapping coverage areas. Base stations 298, 294, and 291, are coupled to a base station controller (BSC) 250, which includes, among other things, a processor 262 and a memory 264 and which is in turn coupled to a mobile switching center (MSC) 260, also including, among other things, a processor 262 and a memory 264. BSC and MSC operate according to well known methods and are commercially available from Motorola, Inc.

Multiple access wireless communication between base stations 298, 294, 291 and mobile stations 216, 217 and 218 occurs via radio frequency (RF) channels which provide physical paths over which digital communication signals such as voice, data, and video are transmitted. Base-to-mobile station communications are said to occur on a forward-link channel, while mobile-to-base station communications are referred to as being on a reverse-link channel. A communication system using CDMA channelization is described in detail in TIA Interim Standard IS-95A.

As shown in FIG. 1, communication signal 213 may be transmitted on an IS-95 forward-link channel such as a paging channel or a traffic channel from a "source" base station such as base station 294 to mobile station 216. Communication signal 215 may be transmitted via an IS-95 reverse-link channel such as an access channel or a traffic channel by mobile station 216 to its source base station, base station 294. Similarly, mobile station 218 may be receiving a communication signal (not shown) on a forward-link channel from it's source base station, base station 298, and transmitting a communication signal (not shown) on a reverse-link channel to base station 298.

In order to determine a specific mobile station's location with respect to a particular cell within wireless communication system 200, mobile registration may be implemented. Mobile registration of a mobile station, such as mobile station 216, to a source base station, such as BTS 294, is done on the reverse-link signaling channel, also referred to as an access channel, and serves to update subscriber records (not shown) in the MSC or associated Location Registers (not shown), so that mobile station 216 may be located with respect to a particular paging area within cellular network 200 in the event of an incoming paging message. Mobile station 216 must be powered-up to register, and be registered by, wireless communication system 200. Mobile station 216 may periodically re-register as it moves through cellular network 200, the registration and re-registration dictated by software parameters, the parameters based on time and/or area, and selected by a system operator.

A paging message may be sent to mobile station 216 as a broadcast page which broadcasts a page to coverage areas served by wireless communication system 200, in order to seek an acknowledgment of mobile station 216's presence on an Access Channel. Similarly, a paging message may be sent to mobile station 216 as a zone page which broadcasts the page to a portion of wireless communication system 200, such as coverage areas 220 and 224. Boundaries delineating zone size are typically selected to encompass a chosen group of coverage areas and are defined by parameters which have been selected and programmed into database software located for example, at the base station controller (BSC) or the mobile switching center (MSC), by the system operator.

Effective mobile station registration is predicated on the fact that each mobile station can be uniquely identified by the serving BSC. The unique identity assignment is accomplished prior to a mobile station such as mobile station 216, being released to a subscriber (not shown). During manufacturing, a mobile station such as mobile station 216 is assigned an electronic serial number (ESN). The system operator, upon distributing mobile station 216 to a subscriber, then assigns a unique identity, for example a phone number, a directory number, a mobile identification number, an international mobile identification number (IMSI), or a temporary mobile station identity (TMSI) to mobile station 216. Thus, the unique identity is associated with the ESN and may be used for tracking and billing activities associated with mobile station 216.

According to a preferred embodiment of the present invention, the unique identity of a second mobile communication unit such as mobile station 217, is facilitated when a region likely to contain mobile station 217 is substantially distinguished from a position likely to contain other mobile stations such as mobile stations 216 and 218. To identify the unique identity associated with target mobile station 217, a first communication unit, specially customized, for example custom mobile station 319, is enlisted.

Figure 2:
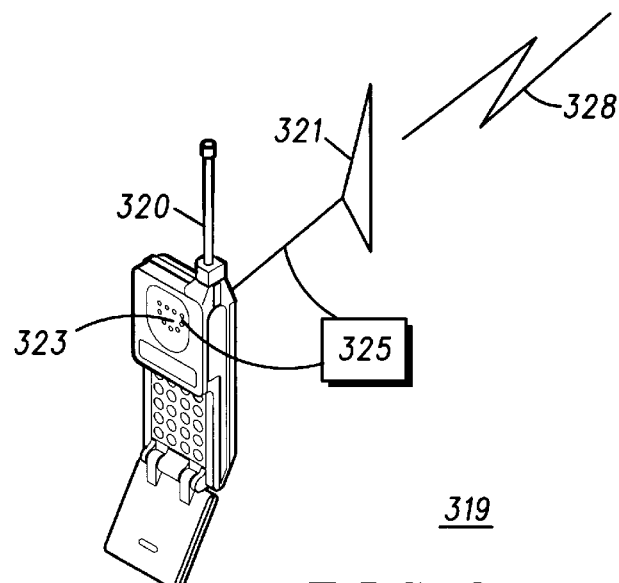
FIG. 2 depicts a custom mobile station which operates in the system in FIG. 1, according to a preferred embodiment of the present invention.

As shown in FIG. 2, custom mobile station 319 may be a standard mobile station well known in the art, to which has been added an activation device 323, a controller 325, and an additional antenna 321. Antenna 321 may be a directional antenna capable of transmitting a narrowbeam signal 328, manipulation of antenna 321 responsive to controller 325, controller 325 operation initiated by activation device 323. Controller 325 may be implemented in a variety of ways, for example, using a digital signal processor (DSP). Activation device 323 may, for example, be an externally mounted button, a switch, or a predetermined sequence entered locally, or entered remotely and then transmitted to mobile station 319.

Figure 3:
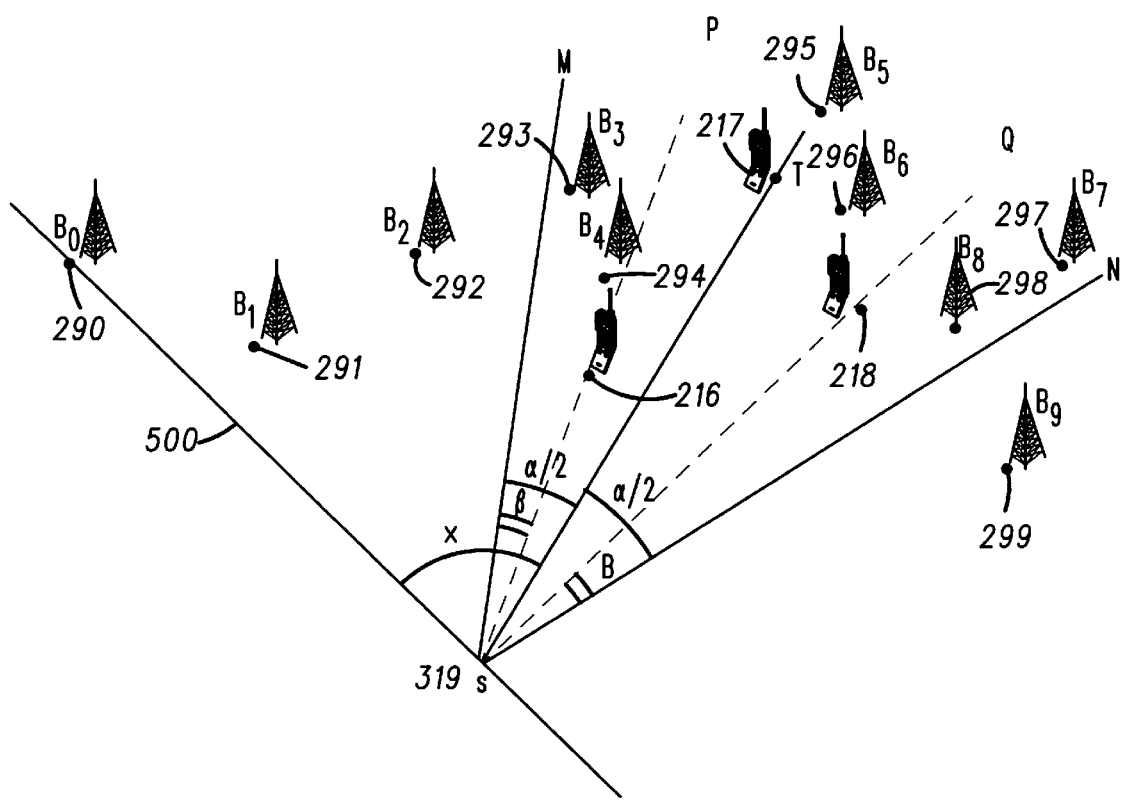
FIG. 3 illustrates geographical depiction of a wireless communication system according to a preferred embodiment of the present invention.

In FIG. 3, target mobile station 217 is located at a location T within cellular network 200. For purposes of discussion, nine base stations, 290, 291, 292, 293, 291, 294, 296, 297, 298, and 299 are shown, although two base stations may be sufficient calculate geographical coordinates associated with a region likely to contain target mobile station 217. As is recognized in the art of wireless communication systems, the positions, longitude and latitude, of base stations 290–299 is known.

The region likely to contain target mobile station 217 may be estimated using line-of-sight alignment and radio frequency spread spectrum signal characteristics collected by local base stations. Such radio frequency spread spectrum signal characteristics may include widebeam signal strength measurements, narrowbeam signal strength measurements and signal time-of-arrival data, measured with respect to a reference axis. The radio frequency spread spectrum signal characteristics are collected at local base stations such as base stations 290–299 which are positioned at locations $B_0$, $B_1$, $B_2$, ... $B_9$ respectively. For example, base station 290 is located at position $B_0$, base station 291 is located at position $B_1$ and base station 299 is located at position $B_9$.

Substantially distinguishing a position T of target mobile 217 from the position of surrounding mobile stations such as 216 and 218 may be accomplished as follows. An operator of custom mobile 319, having first established a line-of-sight with target mobile 217, aligns custom mobile 319 such that its directional antenna 321, points toward mobile station 217. Having completed the line-of-sight alignment, the operator initiates a search sequence in custom mobile station 319 by enabling activation device 323.

Referring back to FIG. 1, the search sequence begins with custom mobile 319 having its position, S, determined with respect to a number of base stations such as a first base station, base station 291 a second base station, base station 294, and a third base station such as base station 298, by transmitting on its omni-directional antenna 320, a widebeam signal 326 (although widebeam signal 326 is depicted as an angle, the omni-directional antenna 320 radiates 360°). Widebeam signal characteristics such as signal strength and signal-time-of-arrival information collected at base stations 291, 294 and 298, enable calculation of the position of custom mobile 319 using location methods, such as trilateration, which are well known in the art. It is contemplated however, that custom mobile station 319 may have it's position determined in any suitable manner.

Following transmission of widebeam signal 326 and subsequent position determination, custom mobile station 319 notifies a local base station, such as base station 291, of its readiness to select and operate its directional antenna 321 and subsequently transmit a narrowbeam signal in a line-of-sight towards target mobile 217. Upon receipt of such notification, base station 291 validates custom mobile station's 319 request to transmit a narrowbeam signal, validation implemented at BSC 250 and/or MSC 260, according to well-known methods.

As shown in FIG. 3, custom mobile 319 next proceeds to transmit a narrowbeam signal 328 towards target mobile station 217 located at position T. Narrowbeam signal 328 which may be depicted as angle M-S-N, may be assumed to have a characteristic transmission footprint a degrees wide, centered around line S-T. Similarly, the angle created by angle M-S-T and N-S-T may be assumed to be α/2 degrees wide. As shown, angle P-S-Q may be used to represent a central area of angle M-S-N, namely the area where the signal strength of narrow beam signal 328 will be strongest. Further, areas depicted by angles M-S-P and Q-S-N, represent areas where the signal strength of narrowbeam signal 328 fades gradually towards zero (discussed in connection to FIG. 4).

An arbitrary reference axis 500 may be delineated by a line drawn from the known position of $B_0$ (base station 290) to custom mobile 319 determined by aforementioned methods to be located at position S, to form line S $B_0$. Angles defined by $B_0$-S-$B_1$, $B_0$-S-$B_2$, to $B_0$-S-$B_9$ may be calculated by the BSC or the MSC since the locations of base stations 290–299 are known. Calculation of an unknown angle, angle χ, defined by angle $B_0$-S-T, formed between the reference axis 500 and the line defined by custom mobile station position S to target mobile station position T, will yield a position likely to contain target mobile station 217. The following description provides a method in which to calculate angle χ, although there are many others. The method discussed below represents a simplified example which assumes that target mobile 217 is centered in the transmitted narrowbeam signal, custom mobile 319 utilizes an ideal narrowbeam transmission model as shown in FIG. 3, and convenient placement of base stations to facilitate discussion, to calculate angle χ.

Transmission of narrowbeam signal 328 from directional antenna 321 yields narrowbeam signal characteristics such as signal strength and signal-time-of-arrival information, at base stations 290–299. At each base station, differences in signal characteristics, such as signal strength, between widebeam signal 326 and narrowbeam signal 328 are recorded. For example, based on the configuration shown in FIG. 3, upon transmission of narrowbeam signal 328 delineated by angle M-S-N, the narrowbeam signal strength received at base station 292 may be negligible, while significant signal strength increases above those measured from widebeam signal 326 (shown in FIG. 1), will likely be observed at base station 295. Based on a comparison of the widebeam signal characteristics and narrowbeam signal characteristics by base stations 290–299, geographical coordinates associated with angle χ, are computed by the BSC or MSC.

Figure 4:
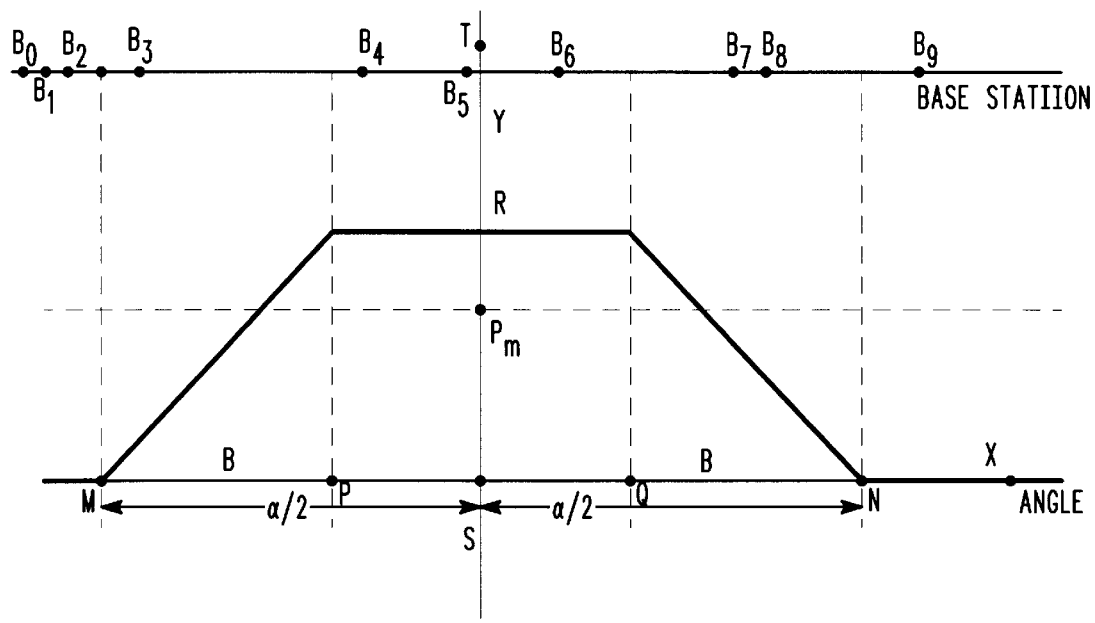
FIG. 4 illustrates an ideal power distribution of narrowbeam transmission angles shown in FIG. 2.

FIG. 4 depicts an example of an ideal spatial distribution of narrowbeam signal strength, energy, at a given distance from S in narrowbeam signal 328, narrowbeam signal 328 being depicted in FIGS. 1 and 3. The horizontal axis, axis x, represents the transmission angle of narrowbeam signal 328, centered with respect to line-of-sight line, ST. The vertical axis, axis y, represents the signal strength of narrowbeam signal 328. A second horizontal axis across the top of FIG. 3 depicts base station positions $B_0$-$B_9$ relative to the transmission angle of narrowbeam signal 328. The average received energy of transmitted narrowbeam signal 328 may be defined as $P_m$.

Referring to FIGS. 3 and 4, the signal strength of narrowbeam signal 328 in the area outside of angle M-S-N, is zero while the signal strength of narrowbeam signal 328 is maximum inside the area defined by angle P-S-Q. The areas of signal strength transition from zero to maximum signal strength are defined by angles M-S-P and Q-S-N, each β degrees wide.

Denoting Z as a position on the horizontal axis between the origin S and an arbitrary point, the power level, or received signal strength from narrowbeam transmission 328 at Z, may be referred to as P(Z), where P(Z) is the following function:

$P(Z)=kP_m$, if Z is between $[(-\alpha/2)+\beta, (\alpha/2)-\beta]$;

$[kP_m/\beta][-Z+(\alpha/2)]$, if Z is between $[(\alpha/2)-\beta, (\alpha/2)]$;

$[kP_m/\beta][Z+(\alpha/2)]$, if Z is between $[(-\alpha/2),(-\alpha/2)+\beta]$;

0, if Z is outside $[(-\alpha/2), (\alpha/2)]$;

where α is the known angle of transmission of the narrowbeam signal 328, β is the known angle corresponding to the areas where the signal strength of narrowbeam signal 328 fades from it's maximum level to zero, and k is a known multiplicative constant, it's value dependent on the spatial distribution of the energy in the narrowbeam signal 328. $P_m$ is the average power in narrowbeam signal 328 at the distance where the measurement takes place.

Looking at the P(Z) function and referring again to FIGS. 3 and 4, base stations 290, 291, 292 and 299 fall outside of the transmission path of narrowbeam signal 328 and therefore may not be useful in calculating angle $\chi$ since signal strength from narrowbeam signal 328 are likely to be zero. Similarly, base stations 291, 294, and 296 may not be useful in calculating angle $\chi$, because the function P(Z) may not yield variances of the received power levels from narrowbeam transmission 328 at Z, which would correspond to unique angles associated with base station positions $B_4$–$B_6$, but instead, may yield a constant power level of $kP_m$ representative of the interval $[(-\alpha/2)+\beta, (\alpha/2)-,\beta]$. Finally, using received power levels from narrowbeam transmission 328 at positions $B_7$ and $B_8$ together will likely be impractical because they are too close to each other and their power readings, adjusted for possible propagation distance difference, will not significantly vary. Thus to achieve significant variations of received power levels from narrowbeam transmission 328 needed to substantially distinguish the position T of target mobile 217, at least two of the following base stations sets $\{B_3\}$, $\{B_4, B_5, B_6\}$ and $\{B_7, B_8\}$ may be selected, and within each selected set, one base station may be selected.

Received power levels from narrowbeam transmission 328 at two base stations, 293 at position $B_3$ and 291 at position $B_4$ are selected. The received power level from narrowbeam transmission 328 at base station 293 provides the measurement necessary to narrow down the position of target mobile 217 to two possible location angles, relatively symmetrical to the known position $B_3$ of base station 293. In order to select one of the two possibilities, another power level measurement provided by base station 291 at location $B_4$ is used. The higher power level detected by base station 291 coupled as well as its relative direction with respect to base station 293, indicates which of the two possible location angles yield the highest probability of the location of target mobile 217.

Thus, optimal conditions for substantially distinguishing the position T of target mobile 217 are that two base stations may be positioned such that they are both within the coverage area of the narrowbeam signal 328, that at least one may be in an area such as the area defined by angle M-S-P or angle Q-S-N, where the signal strength of narrowbeam signal 328 is decreasing, and that the two base stations may not be configured such that a meaningful. difference in the narrowbeam signal strength cannot be ascertained.

Figure 5:
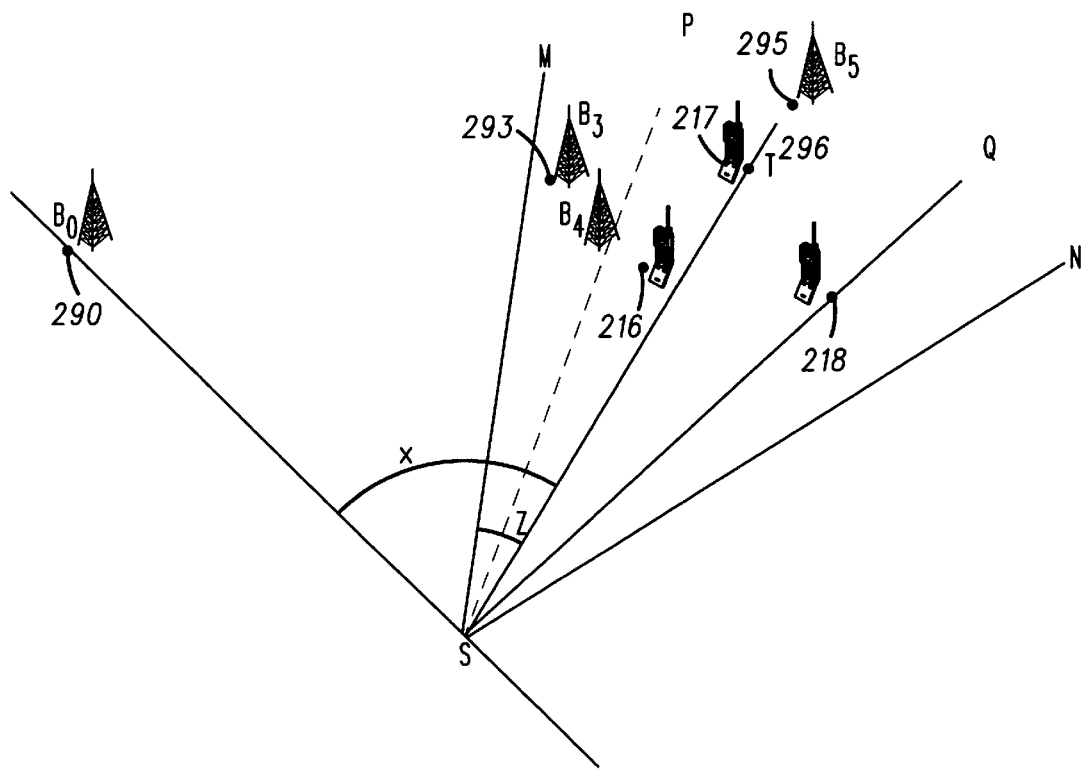
FIG. 5 illustrates an example of calculating region using FIGS. 3 and 4.

For example in FIG. 5, calculation of angle $\chi$ may be accomplished by calculating the angle $B_3$-S-T denoted as Z, and adding it to the known angle $B_0$-S-$B_3$. Calculation of angle $B_3$-S-T may be accomplished as follows: Denote $P_{3m}$ as the average received power level from narrowbeam transmission 328, received at a point located at a distance equal to the distance from custom mobile station 319 at position S to base station 293 located at position $B_3$. The value of the average received power level from narrowbeam transmission 328 depends on the transmission power, the distance traveled and the propagation model being used. The value may also be roughly approximated as being $P_{3m}=360$ $P_{3w}/\alpha$, where $P_{3w}$ is the received power of widebeam signal 326, using an omni antenna, and $\alpha$ is the is the known angle of transmission of the narrowbeam signal 328 in degrees.

Denoting the received narrowbeam transmission power at base station 293 to be $P_{3n}$, a measurable quantity, to be a function of angle Z yielding $P(Z)=P_{3n}$.

By substituting FIG. 3 functions in the equation $P(Z)=P_{3n}$, we obtain $$[k^*P_{3m}/\beta][Z+(\alpha/2)]=P_{3n}.$$

$$Z=(\beta^*P_{3n}/k^*P_{3m})-(\alpha/2).$$

$$Z=(\beta^*P_{3n}^*\alpha/k^*360^*P_{3w})-(\alpha/2)$$

since $P_{3m}=360^*P_{3w}/\alpha$ $$Z=(\alpha/2)[(\beta^*r_3/180^*k)-1]$$

where ratio $r_3=P_{3n}/P_{3w}$.

Since $P_{3n}$, $P_{3m}$, $P_{3w}$, are measured values and k, $\beta$, and $\alpha$ are known characteristics of the distribution of energy of narrowbeam signal 328, angle Z (angle $B_3$-S-T) may be found. Upon calculation of angle $B_3$-S-T, the known angle from reference axis 500 is added to angle $B_3$-S-T, yielding angle $\chi$ (angle $B_0$-S-T). For example, angle $B_0$-S-T is composed of angle $B_0$-S-$B_3$, known, added to angle $B_3$-S-T, calculated.

Following calculation of angle $\chi$, local base stations such as base stations 293–295 may map geographical coordinates of the areas of interest such the region formed by angle P-S-Q and line S-T.

Calculation of geographical coordinates using aforementioned methods are based on the ability of local base stations to measure signal strength, emanating from custom mobile station's 319 omni-directional and directional antenna, as well as propagation delays. In addition, although a simplified example calculation, comparing a first comparison value to a second comparison value is described herein, a more complex processing of measured values may be necessary to calculate angle $\chi$.

It will be appreciated that the variation in received signal strength at base stations 290–299 depends primarily on the design of antennas 320 and 321, distance from mobile station 319 to each base station 290–299, and the pointing angle of antenna 321.

It is contemplated that although a first base station and a second base station are described herein, signal characteristics received at additional base stations such as base station 298 may be included in calculating location of mobile station 217 and the subsequent identity of the subscriber.

Following determination of geographical coordinates associated with the position or area highly likely to contain mobile station 217, BSC 250 instructs base station sectors providing coverage to the highly likely area, for example the area associated with angle P-S-Q, or calculated angle $B_3$-S-T, to request mobile stations within signaling range, to re-register. The area highly likely to contain mobile station 217 may be variable depending on base station configuration, environmental conditions, line-of-sight accuracy, or other applicable factors.

As previously discussed, mobile station registration may yield the identity and position of each mobile station. If mobile stations are not aware of their positions, local base stations may determine their position using trilateration (discussed above). Local base stations may then eliminate mobile stations which are positioned outside of the region highly likely to contain mobile station 217.

For example, both mobile stations 216, 217 and 218 may be within the signaling range of base station 294 and hence, when requested by base station 294, re-register. Re-registration information transmitted by mobile stations 216, 217 and 218 may be used to determine that mobile station 218 falls outside of the region, defined by angle $B_3$-S-T. As a result, the identity of mobile station 218 is eliminated as a possible identity of target mobile station 217. The position and thus the unique identity of target mobile station 217 may then be selected from the remaining group of re-registered mobile stations by the MSC, or a BSC and forwarded to custom mobile station 319 via base station 291.

In an alternate embodiment, omni-sector base stations identified to have a portion of their coverage area within the chosen area, geographical coordinates associated with angle $B_3$-S-T, may request mobile stations within there signaling range, to re-register. For example mobile station 218 within signaling range of base station 298, may be requested to re-register by base station 298, base station 298 having a portion of its coverage area in the area highly likely to contain mobile station 217.

As shown, it is possible that the steps of mobile station re-registration, and subsequent elimination of mobile stations which are positioned outside of the area highly likely to contain mobile station 217, may not yield one mobile station, target mobile station 217. Instead, more than one mobile station may remain. Hence, in a further embodiment, the aforementioned procedure may be applied several times with the resulting mobile station identities intersected, to eliminate undesired mobile stations.

In a further embodiment, variation of the width of the angle of narrowbeam signal 328 may be employed to cover base stations in order to provide more suitable measurements in successive attempts to determine angle $\chi$.

Figure 6:
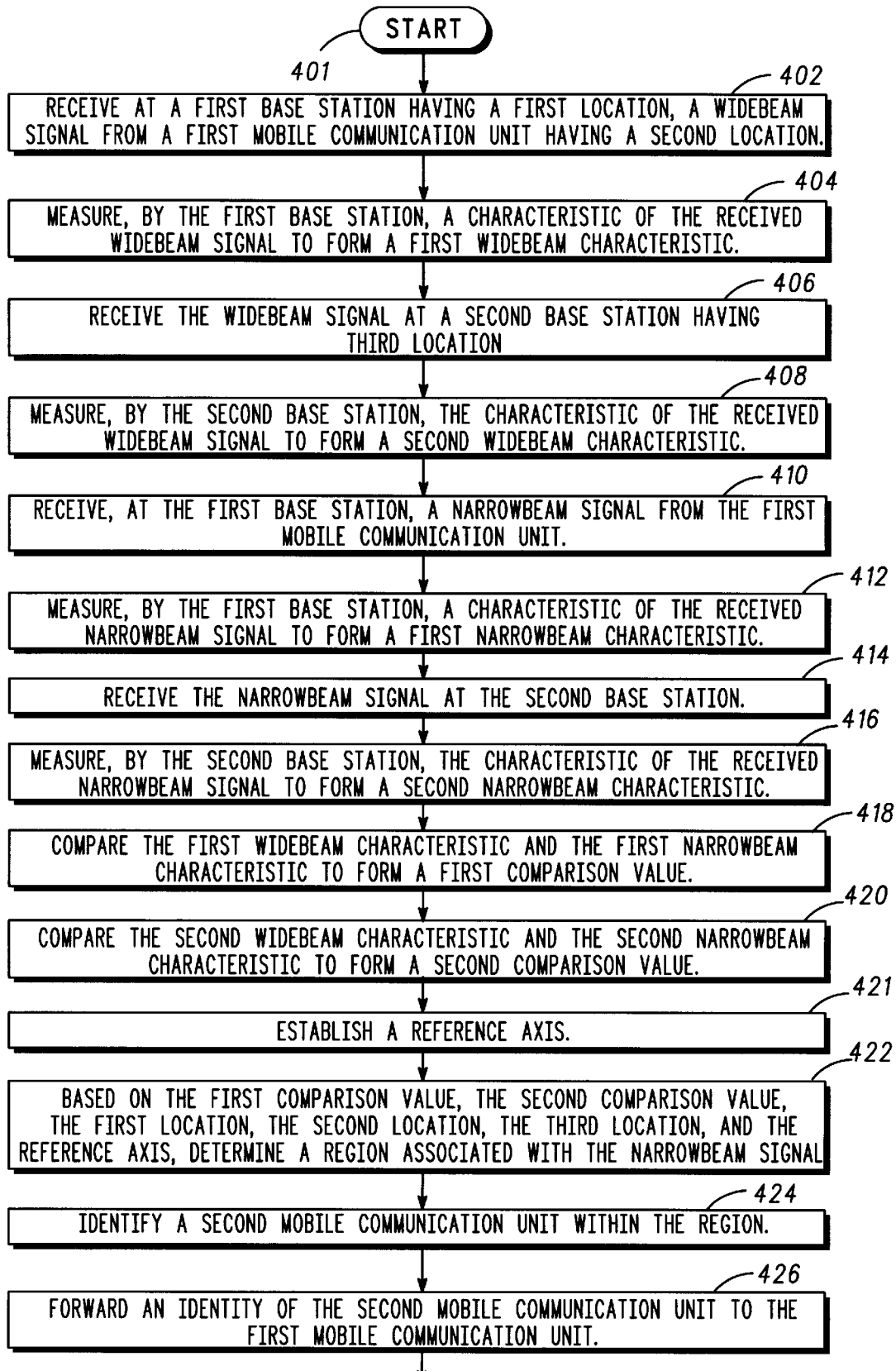
FIG. 6 illustrates a call flow of a method for identifying a mobile communication unit according to a preferred embodiment of the present invention.

FIG. 6 is a flowchart of a method for identifying a mobile station user, according to a preferred embodiment of the present invention begins at block 401. A first step at block 402 includes receiving at a first base station at a first location, a widebeam signal from a first communication unit situated at a second location. At block 404, a characteristic of the received widebeam signal is measured by the first base station to form a first widebeam characteristic. Next, at block 406, the widebeam signal is received by a second base station situated at a third location. At block 408, the characteristic of the received widebeam signal is then measured by the second base station, to form a second widebeam characteristic. A next step at block 410, includes receiving at the first base station, a narrowbeam signal from the first mobile communication unit. At block 412, a characteristic of the received narrowbeam signal is measured by the first base station to form a first narrowbeam characteristic. At block 414, the narrowbeam signal is received at the second base station. Next at block 416, the characteristic of the received narrowbeam signal is measured by the second base station to form a second narrowbeam characteristic. At block 418, the first widebeam characteristic is compared to the first narrowbeam characteristic to form a first comparison value. At block 420, the second widebeam characteristic is compared to the second narrowbeam characteristic to form a second comparison value. A reference axis is established at block 421. At block 422, a region associated with the narrowbeam signal is determined based on the first comparison value, the second comparison value, the first location, the second location, the third location and a reference axis. Next, at block 424 a second mobile communication unit is identified within the region, and at block 426 the identity of the second mobile communication unit is forwarded to the first mobile communication unit.

It will be apparent that other and further forms of the invention may be devised without departing from the spirit and scope of the appended claims and their equivalents. It will also be understood that this invention is not limited in any manner to the specific embodiments described above, but will only be governed by the following claims and their equivalents.

We claim:

1. In a wireless communication system, a method for identifying a mobile communication unit, the method comprising the steps of:

receiving at a first base station having a first location, a widebeam signal from a first mobile communication unit having a second location;

measuring, by the first base station, a characteristic of the received widebeam signal to form a first widebeam characteristic;

receiving the widebeam signal at a second base station having a third location;

measuring, by the second base station, the characteristic of the received widebeam signal to form a second widebeam characteristic;

receiving, at the first base station, a narrowbeam signal from the first mobile communication unit;

measuring, by the first base station, a characteristic of the received narrowbeam signal to form a first narrowbeam characteristic;

receiving the narrowbeam signal at the second base station;

measuring, by the second base station, the characteristic of the received narrowbeam signal to form a second narrowbeam characteristic;

comparing the first widebeam characteristic and the first narrowbeam characteristic to form a first comparison value;

comparing the second widebeam characteristic and the second narrowbeam characteristic to form a second comparison value;

establishing a reference axis;

based on the first comparison value, the second comparison value, the first location, the second location, the third location, and the reference axis, determining a region associated with the narrowbeam signal;

identifying a second mobile communication unit within the region; and forwarding an identity of the second mobile communication unit to the first mobile communication unit.

2. The method according to claim 1, wherein the wireless communication system comprises a code division multiple access (CDMA) system.

3. The method according to claim 1, wherein the first mobile communication unit comprises an activation device and a directional antenna.

4. The method according to claim 1, wherein the second mobile communication unit is in a line-of-sight with the first mobile communication unit.

5. The method according to claim 4 wherein the narrowbeam signal comprises a radio frequency spread spectrum signal.

6. The method according to claim 5 wherein the narrowbeam signal is transmitted by the directional antenna.

7. The method according to claim 1 wherein the narrowbeam signal width may be varied.

8. The method according to claim 1, further comprising the step of:

determining the second location.

9. The method according to claim 8, wherein the step of determining the second location comprises the steps of:

sending a message from the first mobile communication unit to a plurality of base stations;

based on a time of receipt of the message at the plurality of base stations, calculating the second location.

10. The method according to claim 1, wherein the step of establishing the reference axis comprises the steps of:

selecting a reference base station.

11. The method according to claim 1, further comprising the step of:

prior to the step of receiving the narrowbeam signal at the first base station, validating the first mobile communication unit.

12. The method according to claim 11, wherein the step of validating the first communication unit comprises the steps of:

securing authorization from the first base station;

based on the authorization, the first mobile communication unit transmitting the narrowbeam signal.

13. The method according to claim 1, wherein the first narrowbeam characteristic comprises a signal strength.

14. The method according to claim 1, wherein the region comprises an angle.

15. The method according to claim 14, wherein the angle comprises calculated geographic coordinates.

16. The method according to claim 1, wherein the step of identifying the second mobile communication unit within the region further comprises the steps of:

requesting by one of the first base station and the second base station, the second mobile communication unit to re-register.

17. The method according to claim 1, wherein the identity of the second mobile communication unit is selected from the group consisting of: a directory number, a mobile identification number, an international mobile identification number, a temporary mobile station identity, and an electronic serial number.

18. In a wireless communication system, a method for identifying a mobile communication unit, the method comprising the steps of:

establishing a line-of-sight between a first mobile communication unit and a second communication unit;

determining a location of the first mobile communication unit;

transmitting from the first mobile communication unit to a first base station having a first location, a widebeam signal;

transmitting from the first mobile communication unit to a second base station having a second location, the widebeam signal;

transmitting from the first mobile communication unit to the first base station, a narrowbeam signal;

transmitting from the first mobile communication unit to the second base station, the narrowbeam signal;

receiving at the first mobile communication unit from the first base station, a first comparison value, said first comparison value represents the comparison characteristics of the widebeam signal and the narrowbeam signal received at the first base station;

receiving at the first mobile communication unit from the second base station, a second comparison value, said second comparison value represents the comparison of measured characteristics of the widebeam signal and the narrowbeam signal received at the second base station;

based on the first comparison value, and the second comparison value, calculating a region associated with the narrowbeam signal; and receiving at the first mobile communication unit, an identity of the second mobile communication unit within the region.

19. The method according to claim 18, wherein the wireless communication system comprises a code division multiple access (CDMA) system.

20. The method according to claim 18, wherein the first mobile communication unit comprises an activation device and a directional antenna.

* * * * *